(12) United States Patent
Chiu

(10) Patent No.: US 11,022,758 B2
(45) Date of Patent: Jun. 1, 2021

(54) FIBER OPTICAL ADAPTER HAVING A RAILED PARTITIONING

(71) Applicant: ACON OPTICS COMMUNICATIONS INC., New Taipei (TW)

(72) Inventor: Chin-Huang Chiu, New Taipei (TW)

(73) Assignee: ACON OPTICS COMMUNICATIONS INC., New Taipei (TW)

(*) Notice: Subject to any disclaimer, the term of this patent is extended or adjusted under 35 U.S.C. 154(b) by 0 days.

(21) Appl. No.: 16/946,242

(22) Filed: Jun. 11, 2020

(65) Prior Publication Data

US 2020/0393625 A1  Dec. 17, 2020

(30) Foreign Application Priority Data

Jun. 13, 2019  (TW) .................... 108207544

(51) Int. Cl.
*G02B 6/38* (2006.01)

(52) U.S. Cl.
CPC .................... *G02B 6/3807* (2013.01)

(58) Field of Classification Search
CPC .... G02B 6/3807; G02B 6/3877; G02B 6/387; G02B 6/3893; G02B 6/3825; G02B 6/09
See application file for complete search history.

(56) References Cited

U.S. PATENT DOCUMENTS

| | | | | |
|---|---|---|---|---|
| 7,118,281 B2* | 10/2006 | Chiu | .................... | G02B 6/3893 385/53 |
| 9,128,255 B2* | 9/2015 | Sato | .................... | G02B 6/3849 |
| 9,494,746 B2* | 11/2016 | Sanders | ............... | G02B 6/3849 |
| 10,416,392 B2* | 9/2019 | Hsu | ....................... | G02B 6/3825 |
| 10,754,099 B2* | 8/2020 | Cui | ....................... | G02B 6/3825 |
| 10,809,462 B2* | 10/2020 | He | ........................ | G02B 6/3849 |
| 2004/0161207 A1* | 8/2004 | Chiu | .................... | G02B 6/4261 385/88 |
| 2006/0029332 A1* | 2/2006 | Chiu | .................... | G02B 6/4261 385/53 |
| 2010/0054665 A1* | 3/2010 | Jones | ................... | G02B 6/3825 385/59 |
| 2014/0072263 A1* | 3/2014 | Hung | ................... | G02B 6/3825 385/60 |
| 2014/0205239 A1* | 7/2014 | Sato | ...................... | G02B 6/3893 385/55 |
| 2015/0078710 A1* | 3/2015 | Sato | ...................... | G02B 6/3849 385/78 |
| 2019/0170948 A1* | 6/2019 | Cui | ....................... | G02B 6/3897 |
| 2019/0212502 A1* | 7/2019 | Hsu | ....................... | G02B 6/3825 |
| 2019/0212592 A1* | 7/2019 | Chen | .................... | G02F 1/1368 |
| 2019/0331961 A1* | 10/2019 | Chien | .................. | G02F 1/1333 |
| 2020/0393625 A1* | 12/2020 | Chiu | .................... | G02B 6/3807 |

* cited by examiner

*Primary Examiner* — Andrew Jordan
(74) *Attorney, Agent, or Firm* — Innovation Capital Law Group, LLP; Vic Lin

(57) ABSTRACT

A fiber optical adapter includes a base body and a base element. The base body includes a receiving groove. Two ends of the base body form insertion openings respectively communicating with the receiving groove. The base element is in the receiving groove. The base element includes a first connection member, a second connection member combined with the first connection member, and socket members. Each socket member is received in the corresponding first sleeve member of the first connection member and the corresponding second sleeve member of the second connection member.

10 Claims, 6 Drawing Sheets

FIBER OPTICAL ADAPTER HAVING A RAILED PARTITIONING

CROSS-REFERENCE TO RELATED APPLICATION

This non-provisional application claims priority under 35 U.S.C. § 119(a) to Patent Application No. 108207544 in Taiwan, R.O.C. on Jun. 13, 2019, the entire contents of which are hereby incorporated by reference.

FIELD OF THE INVENTION

The instant disclosure relates to an adapter, and more particular to a fiber optical adapter.

BACKGROUND

The optical fiber is an tool for optical transmission. In general, in a fiber optical connection device, two ends of a female adapter are inserted by male optical adapters, thereby achieving the fixation between the adapters of the fiber optical connection device and allowing data transmission between electronic devices.

In general, a Lucent Connector (LC) type optical adapter is an optical transmission connector for connecting to the LC type optical transmission cable for optical signal transmission.

SUMMARY OF THE INVENTION

In the configuration of an LC type optical adapter known to the inventor, the two main bodies (the casing) of the adapter are combined with each other by welding. As a result, the main bodies may be combined with each other with an offset due to improper welding process. Thus, when a stress is applied on the welded portion between the two main bodies, the welded portion may break easily. Moreover, in the manufacture of the adapter, a welding machine has to be provided for the welding process, thereby increasing the manufacturing cost of the adapter.

One embodiment of the instant disclosure provides a fiber optical connector. The fiber optical connector comprises a base body and a base element. The base body comprises a receiving groove. Two ends of the base body form insertion openings respectively communicating with the receiving groove. The base element is in the receiving groove of the base body. The base element comprises a first connection member, a second connection member, and a plurality of socket members. The first connection member comprises a first main body, a first partition plate protruding from one of two sides of the first main body, and a plurality of first sleeve members at two sides of the first partition plate. The side of the first main body forms a plurality of first insertion holes respectively communicating with the first sleeve members, and the first partition plate is in a portion of the receiving groove at one of two ends of the base body. The second connection member comprises a second main body combined with the other side of the first main body, a second partition plate protruding from one of two sides of the second main body, and a plurality of second sleeve members at two sides of the second partition plate. The side of the second main body forms a plurality of second insertion holes respectively communicating with the second sleeve members, and the second partition plate is in a portion of the receiving groove at the other ends of the base body. Two ends of each of the socket members are respectively inserted into the corresponding first insertion hole and the corresponding second insertion hole, and the two ends of each of the socket members are in the corresponding first sleeve member and the corresponding second sleeve member.

In one or some embodiments, the base body comprises a plurality of sliding slots formed on an inner wall of the receiving groove. The first connection member comprises a plurality of first sliding rails formed on an upper portion and a lower portion of the first partition plate, the second connection member comprises a plurality of second sliding rails formed on an upper portion and a lower portion of the second partition plate, and each of the first sliding rails and each of the second sliding rails are respectively engaged with the corresponding sliding slot.

In one or some embodiments, the second partition plate comprises an engaging point protruding from at least one of the second sliding rails, the base body comprises an engaging groove in at least one of the sliding slots, and the engaging point is engaged with the engaging groove.

In one or some embodiments, the first connection member comprises a first protrusion formed on the other side of the first main body, the second connection member comprises a second recessed hole formed on the other side of the second main body, and the first protrusion is engaged with the second recessed hole.

In one or some embodiments, the first connection member comprises a first recessed hole formed on the other side of the first main body, the second connection member comprises a second protrusion formed on the other side of the second main body, and the second protrusion is engaged with the first recessed hole.

In one or some embodiments, each of the socket members comprises a breakoff notch extending in a longitudinal direction, and a cross section of each of the socket members forms a C-shape ring structure.

In one or some embodiments, each of the socket members is an elongated tubular member, and a cross section of each of the socket members forms a O-shape ring structure.

In one or some embodiments, a first annular wall is protruding from each of the first sleeve members and blocked by an end portion of the corresponding socket member.

In one or some embodiments, a second annular wall is protruding from each of the second sleeve members and block by an end portion of the corresponding socket member.

In one or some embodiments, the base body comprises a stopping block formed on an inner wall of the receiving groove, the first main body forms an engaging block, and the stopping block is abutted against the engaging block.

According to one or some embodiments of the instant disclosure, problems occur to the two-piece type base body known to the inventor, such as, misalignment, improper sealing, having a gap between the two pieces, and lower structural strength for the combined base body, can be improved. According to one or some embodiments of the instant disclosure, the first connection member and the second connection member are manufactured with the same mold. After the first connection member and the second connection member are assembled with each other, the first connection member and the second connection member can be assembled into and fixed into the case body in a convenient manner, thereby improving the production and manufacturing of the adapter.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

Figure 1:
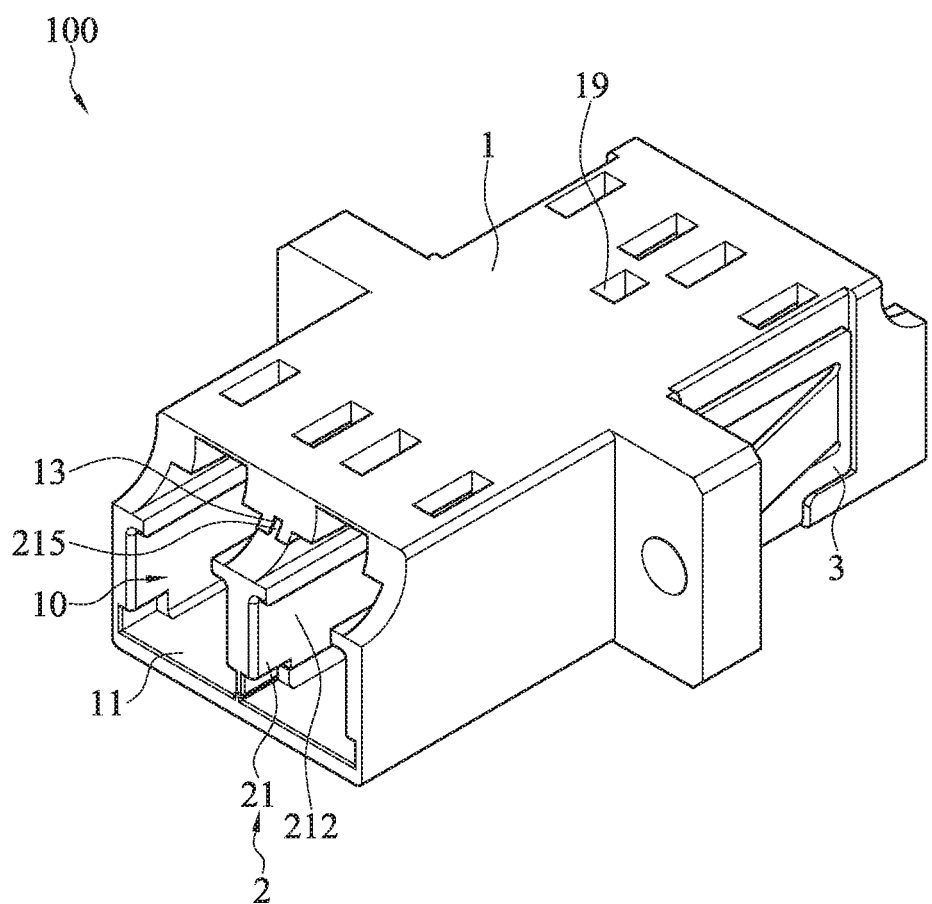
FIG. 1 illustrates a perspective view of a fiber optical adapter according to an exemplary embodiment of the instant disclosure.
Figure 2:
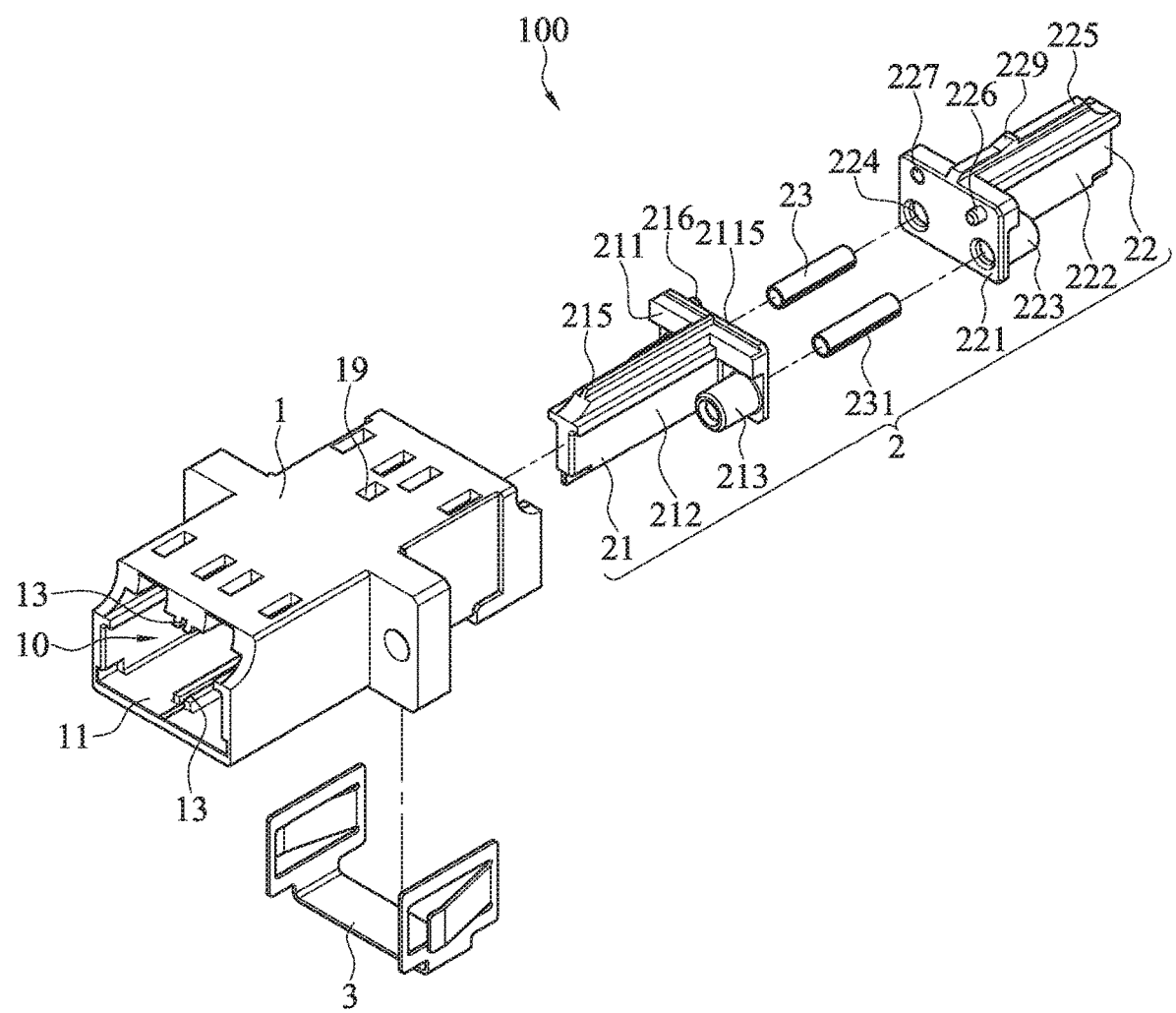
FIG. 2 illustrates an exploded view of the fiber optical adapter of the exemplary embodiment.
Figure 3:
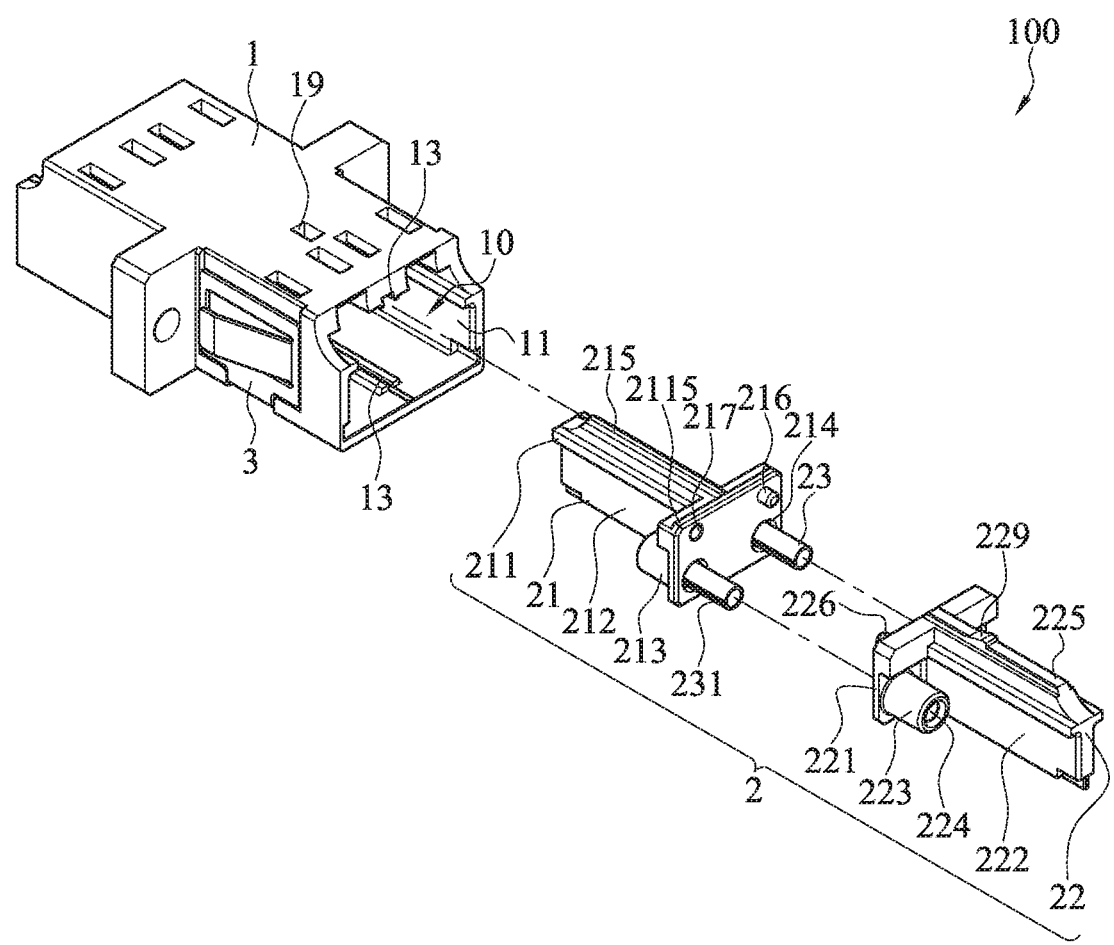
FIG. 3 illustrates a schematic exploded view (1) showing the assembling of the fiber optical adapter of the exemplary embodiment.
Figure 4:
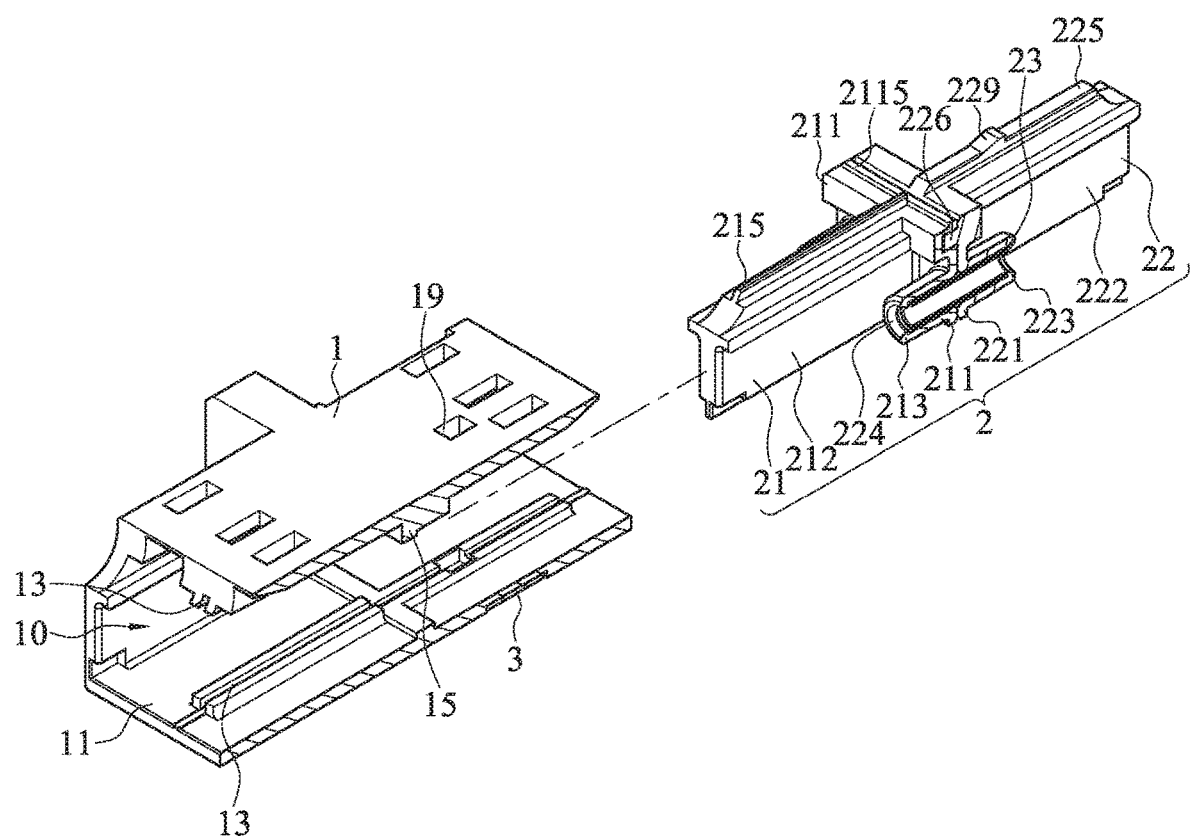
FIG. 4 illustrates a schematic exploded view (2) showing the assembling of the fiber optical adapter of the exemplary embodiment.
Figure 5:
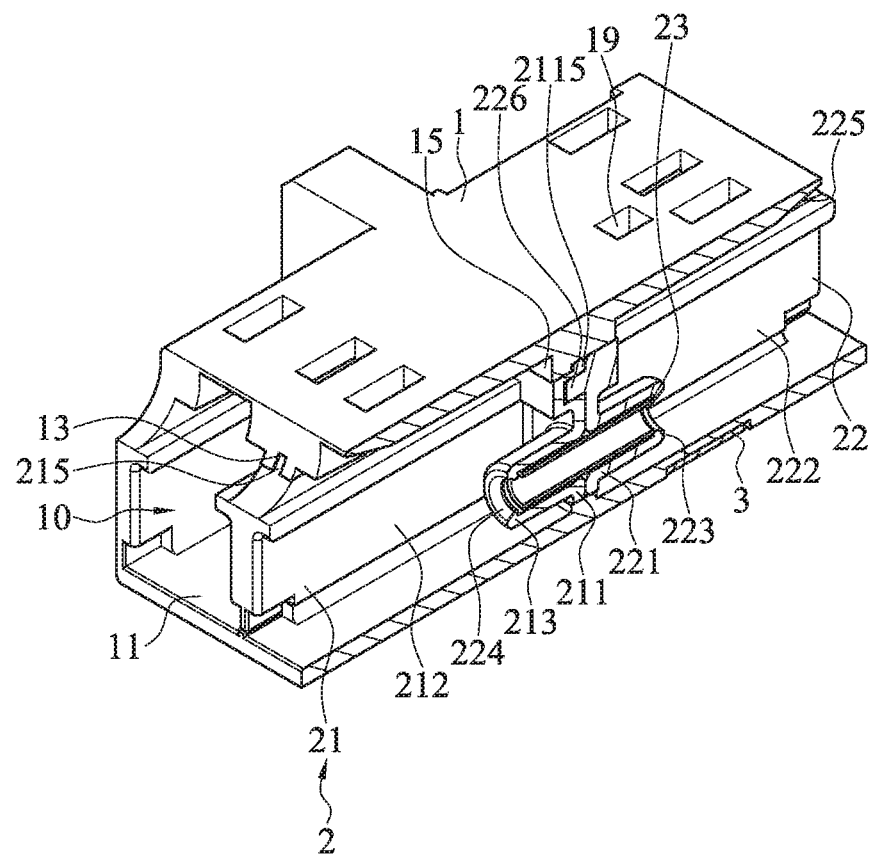
FIG. 5 illustrates a side sectional view showing the assembled optical fiber adapter of the exemplary embodiment.
Figure 6:
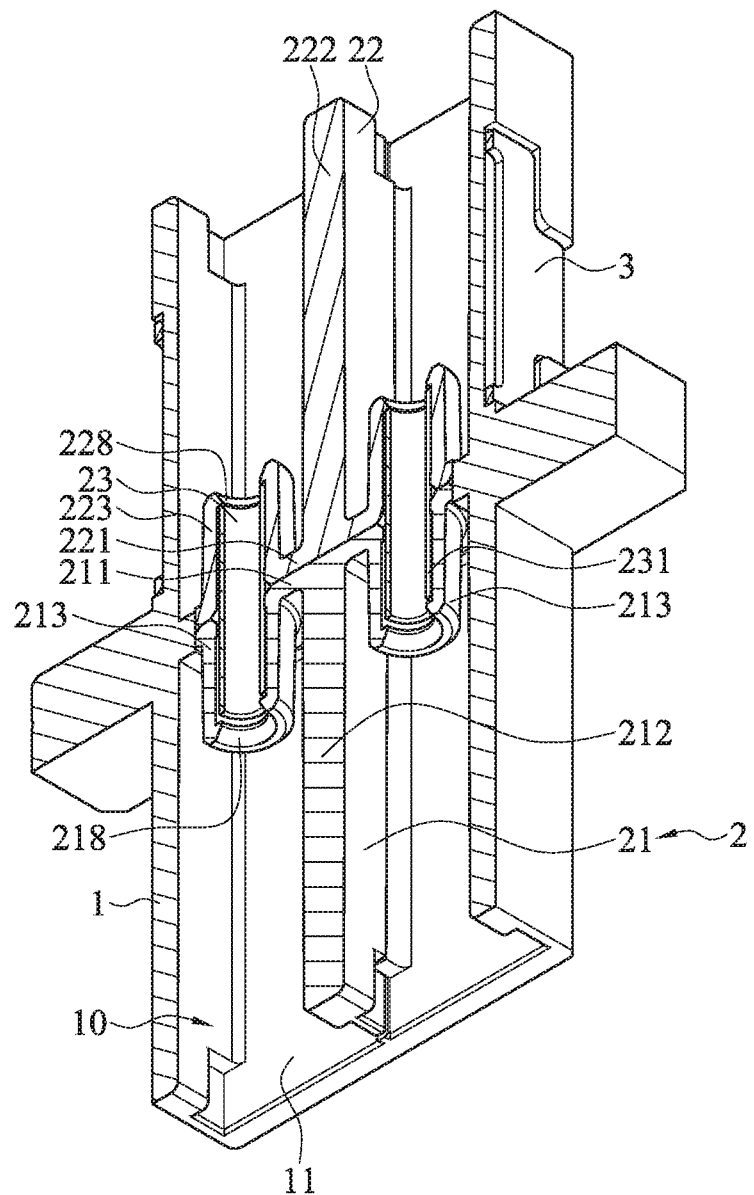
FIG. 6 illustrates a top sectional view showing the assembled optical fiber adapter of the exemplary embodiment.

Please refer to FIGS. 1 to 6. FIG. 1 illustrates a perspective view of a fiber optical adapter according to an exemplary embodiment of the instant disclosure. FIG. 2 illustrates an exploded view of the fiber optical adapter of the exemplary embodiment. FIGS. 3 and 4 illustrate schematic exploded view (1) and (2) showing the assembling of the fiber optical adapter of the exemplary embodiment. FIG. 5 illustrates a side sectional view showing the assembled optical fiber adapter of the exemplary embodiment. FIG. 6 illustrates a top sectional view showing the assembled optical fiber adapter of the exemplary embodiment.

In this embodiment, the fiber optical adapter is provided for being inserted by several optical fiber connectors (not shown). The fiber optical connector may be a Lucent Connector (LC) connector used for high density connection application. The fiber optical adapter 100 comprises a base body 1 and a base element 2.

In this embodiment, the base body 1 comprises a receiving groove 10. Two ends of the base body 1 form insertion openings 11 respectively communicating with the receiving groove 10.

In this embodiment, the base element 2 is in the receiving groove 10 of the base body 1. The base element 2 comprises a first connection member 21, a second connection member 22, and a plurality of socket members 23.

In this embodiment, the first connection member 21 comprises a first main body 211, a first partition plate 212 protruding from one of two sides of the first main body 211, and a plurality of first sleeve members 213 at two sides of the first partition plate 212. The side of the first main body 211 comprises a plurality of first insertion holes 214 communicating with the first sleeve members 213, and the first partition plate 212 is in a portion of the receiving groove 10 at one of two ends of the base body 1.

In this embodiment, the second connection member 22 comprises a second main body 221 combined with the other side of the first main body 211, a second partition plate 222 protruding from one of two sides of the second main body 221, and a plurality of second sleeve members 223 at two sides of the second partition plate 222. The side of the second main body 221 forms a plurality of second insertion holes 224 respectively communicating with the second sleeve members 223, and the second partition plate 222 is in a portion of the receiving groove 10 at the other end of the base body 1.

In this embodiment, two ends of each of the socket members 23 are respectively inserted into the corresponding first insertion hole 214 and the corresponding second insertion hole 224, and the two ends of each of the socket members 23 are in the corresponding first sleeve member 213 and the corresponding second sleeve member 223.

In this embodiment, more specifically, the base body 1 is combined with a buckle member 3 for fixing the base body 1 on the chassis.

In this embodiment, more specifically, the base body 1 comprises a plurality of sliding slots 13 formed on an inner wall of the receiving groove 10. The sliding slots 13 are respectively located at the upper wall surface and the bottom wall surface of the middle portion in the receiving groove 10 in a longitudinal direction. The first connection member 21 comprises a plurality of first sliding rails 215 formed on an upper portion and a lower portion of the first partition plate 212. The second connection member 22 comprises a plurality of second sliding rails 225 formed on an upper portion and a lower portion of the second partition plate 222. Each of the first sliding rails 215 and each of the second sliding rails 225 are respectively engaged with the corresponding sliding slot 13.

In this embodiment, more specifically, the second partition plate 222 comprises an engaging point 229 protruding from at least one of the second sliding rails 225, the base body 1 comprises an engaging groove 19 in at least one of the sliding slots 13, and the engaging point 229 is engaged with the engaging groove 19. After the first connection member 21 and the second connection member 22 are connected and fixed with each other, the first connection member 21 is aligned with and inserted into the insertion opening 11 at one of two ends of the base body 1, so that the first connection member 21 and the second connection member 22 are slid into the receiving groove 10 of the base body 1 and the engaging point 229 is engaged with the engaging groove 19. Therefore, the second connection member 22 can be stably fixed in the base body 1, and the assembling of the fiber optical adapter can be very convenient.

In this embodiment, more specifically, the base element 2 comprises the first connection member 21 and the second connection member 22 adapted to be combined with each other. The first connection member 21 and the second connection member 22 are respectively of a T-shaped structure from a top view thereof, and the assembly of the first connection member 21 and the second connection member 22 is approximately of a cross structure. Moreover, the first connection member 21 comprises a first protrusion 216 formed on the other side of the first main body 211, the second connection member 22 comprises a second recessed hole 227 formed on the other side of the second main body 221, and the first protrusion 216 is engaged with the second recessed hole 227.

In this embodiment, more specifically, the first connection member 21 comprises a first recessed hole 217 formed on the other side of the first main body 211, the second connection member 22 comprises a second protrusion 226 formed on the other side of the second main body 221, and the second protrusion 226 is engaged with the first recessed hole 217.

In this embodiment, more specifically, each of the socket members 23 is made of a ceramic material. In this embodiment, each of the socket members 23 comprises a breakoff notch 231 extending in a longitudinal direction. A cross section of each of the socket members 23 forms a C-shape ring structure. Accordingly, when the core member of the fiber optical connector is inserted into the socket member 23 having the C-shape ring structure, the inner diameter of the core member can be expanded by the breakoff notch 231 of the socket member 23.

In this embodiment, more specifically, each of the socket members 23 is an elongated tubular member, and a cross section of each of the socket members 23 forms a O-shape ring structure. The inner diameter of the socket member 23 having the O-shape ring structure is substantially greater than the inner diameter of the socket member 23 having the C-shape ring structure.

In this embodiment, more specifically, a first annular wall 218 is protruding from each of the first sleeve members 213 and blocked by an end portion of the corresponding socket member 23, and a second annular wall 228 is protruding from each of the second sleeve members 223 and blocked by an end portion of the corresponding socket member 23. The socket member 23 is limited between the first sleeve member 213 and the second sleeve member 223.

In this embodiment, more specifically, the base body 1 comprises a stopping block 15 formed on the inner wall of the receiving groove 10, the first main body 211 forms an engaging block 2115, and the stopping block 15 is abutted against the engaging block 2115.

In this embodiment, more specifically, two ends of the base body 1 may comprise several insertion openings 11. The base body 1 may comprise four insertion openings 11, eight insertion openings 11, sixteen insertion openings 11, thirty two insertion openings 11, so that several optical fiber connectors can be inserted into the insertion openings 11.

In this embodiment, more specifically, the base body 1 is a hollow shell, of a rectangular structure, and of a one-piece member, so that the base body 1 can have a firm structure. The base body is a one-piece member formed by injection molding and has an improved structural strength. It is understood that, the two main bodies of the two-piece type base body known to the inventor are combined with each other by welding.

As a result, the two main bodies of the adapter may be combined with each other with an offset due to improper welding process. Hence, the two main bodies of the adapter are not tightly welded with each other so as to have a gap formed at the welded portion of the adapter. Under this arrangement, optical loss may occur easily and water moist may enter into the adapter easily when the adapter is in use. Moreover, in the manufacture of the adapter, a welding machine has to be provided for the welding process. Furthermore, the adapter manufactured with the welding process would have a lower structural strength.

According to one or some embodiments of the instant disclosure, problems occur to the two-piece type base body known to the inventor, such as, misalignment, improper sealing, having a gap between the two pieces, and lower structural strength for the combined base body, can be improved. According to one or some embodiments of the instant disclosure, the first connection member and the second connection member are manufactured with the same mold. After the first connection member and the second connection member are assembled with each other, the first connection member and the second connection member can be assembled into and fixed into the case body in a convenient manner, thereby improving the production and manufacturing of the adapter.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A fiber optical adapter, comprising:

a base body, comprising a receiving groove, wherein two ends of the base body form insertion openings respectively communicating with the receiving groove; and a base element in the receiving groove of the base body, wherein the base element comprises:

a first connection member, comprising a first main body, a first partition plate protruding from one of two sides of the first main body, and a plurality of first sleeve members at two sides of the first partition plate, wherein the side of the first main body forms a plurality of first insertion holes respectively communicating with the first sleeve members, and the first partition plate is in a portion of the receiving groove at one of two ends of the base body;

a second connection member, comprising a second main body combined with the other side of the first main body, a second partition plate protruding from one of two sides of the second main body, and a plurality of second sleeve members at two sides of the second partition plate, wherein the side of the second main body forms a plurality of second insertion holes respectively communicating with the second sleeve members, and the second partition plate is in a portion of the receiving groove at the other end of the base body; and a plurality of socket members, wherein two ends of each of the socket members are respectively inserted into the corresponding first insertion hole and the corresponding second insertion hole, and the two ends of each of the socket members are in the corresponding first sleeve member and the corresponding second sleeve member.

2. The fiber optical adapter according to claim 1, wherein the base body comprises a plurality of sliding slots formed on an inner wall of the receiving groove, the first connection member comprises a plurality of first sliding rails formed on an upper portion and a lower portion of the first partition plate, the second connection member comprises a plurality of second sliding rails formed on an upper portion and a lower portion of the second partition plate, and each of the first sliding rails and each of the second sliding rails are respectively engaged with the corresponding sliding slot.

3. The fiber optical adapter according to claim 2, wherein the second partition plate comprises an engaging point protruding from at least one of the second sliding rails, the base body comprises an engaging groove in at least one of the sliding slots, and the engaging point is engaged with the engaging groove.

4. The fiber optical adapter according to claim 1, wherein the first connection member comprises a first protrusion formed on the other side of the first main body, the second connection member comprises a second recessed hole formed on the other side of the second main body, and the first protrusion is engaged with the second recessed hole.

5. The fiber optical adapter according to claim 4, wherein the first connection member comprises a first recessed hole formed on the other side of the first main body, the second connection member comprises a second protrusion formed on the other side of the second main body, and the second protrusion is engaged with the first recessed hole.

6. The fiber optical adapter according to claim 1, wherein each of the socket members comprises a breakoff notch extending in a longitudinal direction, and a cross section of each of the socket members forms a C-shape ring structure.

7. The fiber optical adapter according to claim 1, wherein each of the socket members is an elongated tubular member, and a cross section of each of the socket members forms a O-shape ring structure.

8. The fiber optical adapter according to claim 1, wherein a first annular wall is protruding from each of the first sleeve members and blocked by an end portion of the corresponding socket member.

9. The fiber optical adapter according to claim 1, wherein a second annular wall is protruding from each of the second sleeve members and blocked by an end portion of the corresponding socket member.

10. The fiber optical adapter according to claim 1, wherein the base body comprises a stopping block formed on an inner wall of the receiving groove, the first main body forms an engaging block, and the stopping block is abutted against the engaging block.

* * * * *